Nov. 6, 1934.     L. H. MOOMAW     1,979,984
MOTION PICTURE CAMERA
Filed May 8, 1931     2 Sheets-Sheet 1
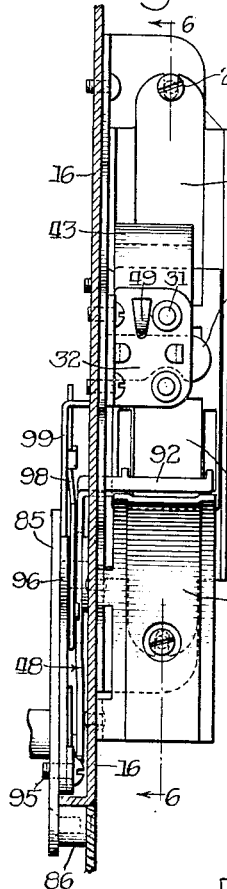
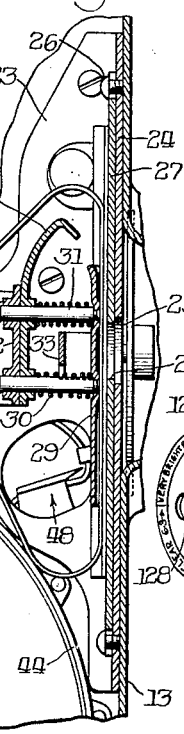
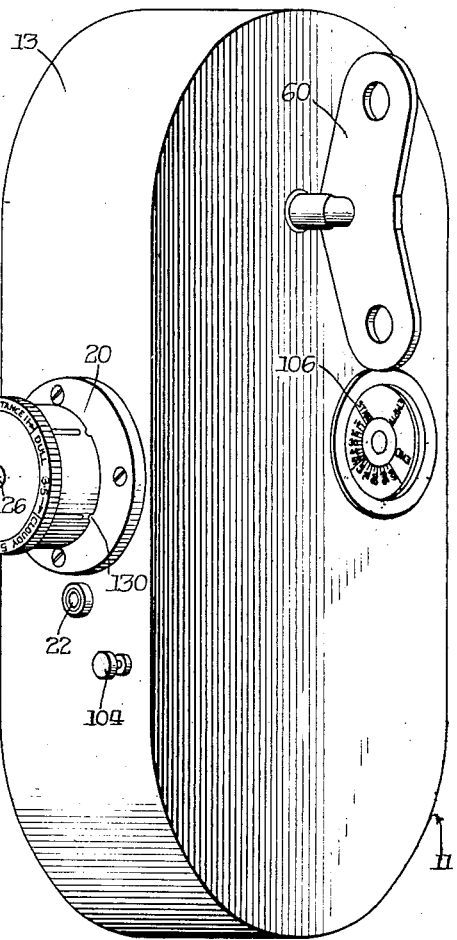
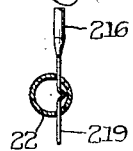
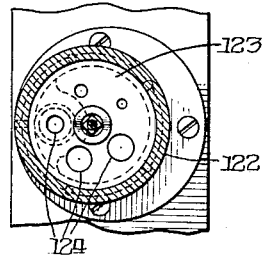
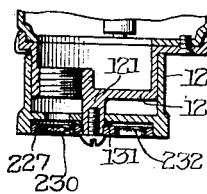
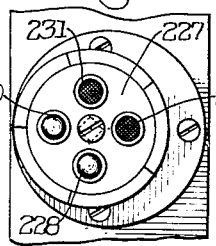
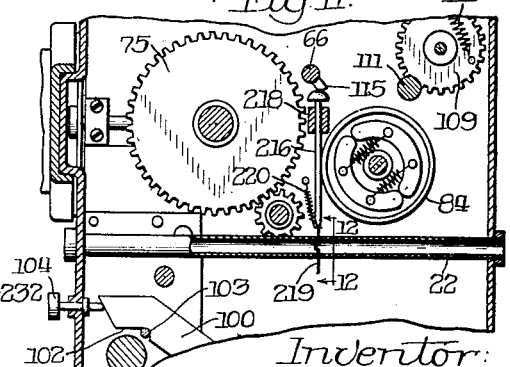
Inventor:
Lewis H. Moomaw Nov. 6, 1934.   L. H. MOOMAW   1,979,984
MOTION PICTURE CAMERA
Filed May 8, 1931   2 Sheets-Sheet 2
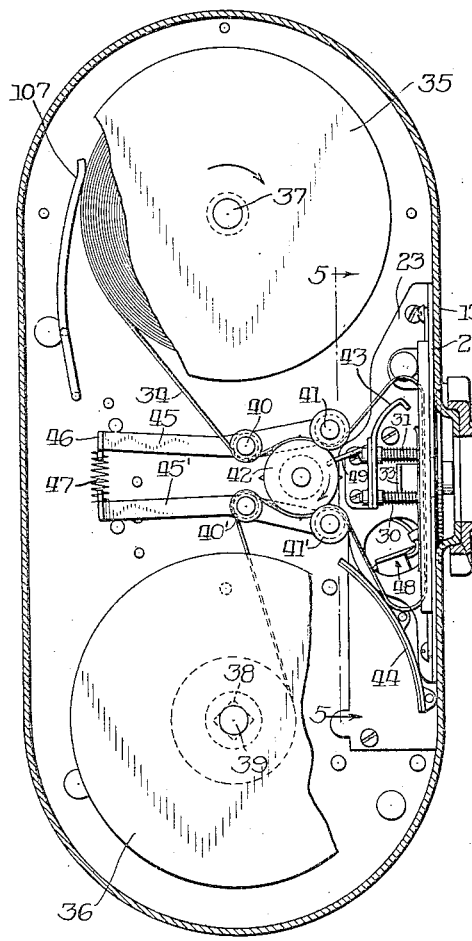
Inventor:
Lewis H. Moomaw.
By Wilkinson, Huxley, Byron & Knight
Attys Patented Nov. 6, 1934

1,979,984

UNITED STATES PATENT OFFICE 1,979,984

MOTION PICTURE CAMERA

Lewis H. Moomaw, Wilmette, Ill.

Application May 8, 1931, Serial No. 535,931

8 Claims. (Cl. 88—18.4)

The invention relates to cameras for making motion pictures and is particularly related to cameras which are especially designed for use by amateurs in making pictures on sixteen millimeter film.

It is a primary object of the invention to produce a camera of the class described which is of extreme simplicity in its construction and can be cheaply manufactured, but, is at the same time, highly sensitive in its operation. The camera contemplated by the present invention has very few operative parts and embodies a novel intermittent mechanical movement which is of very simple construction and extremely accurate in its operation.

A still further object of the invention is to provide a novel type of guide and tension control which governs the movement of the film over the film advancing sprocket and is adapted for easy adjustment while the camera is being threaded.

A still further object of the present invention is to provide an indicating means for indicating the quantity of film which has been exposed in the camera and which will further act as a brake upon the film reel. In this connection the construction also embodies additional means providing a friction brake retarding rotation of the feed reel so as to maintain the film leading to the feed sprocket under tension.

A still further object of the present invention is to provide a novel intermittent film feeding mechanism which will operate efficiently and accurately and which embodies means to automatically align the claw with the perforations in the film.

A still further object of the invention is to provide novel indicating means which will indicate to the operator equal increments of travel of the film in the camera. The result of the present construction is that the operator, whether professional or amateur, will be able to accurately measure the time required for the proper length of run of the film for securing satisfactory projection of the pictures on the screen.

The general construction of the camera contemplated in the present invention comprises a case or housing divided by a partition with the motor and its associated gears for controlling the movement of the film through the camera and the operation of the shutter on one side of the partition, and the film reels, the intermittent mechanical movement, the film advancing sprocket, etc., on the other side of the partition. It is proposed to make substantially all the parts, including the gears, of stamped metal, and it will be seen from the following description that when made in this manner the camera can be manufactured at a very small cost.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a perspective view showing a preferred form of the invention;

Figure 2 is an elevational view which may be considered as having been taken from the left side of Figure 1 and shows the film carrying compartment with the casing cover removed;

Figure 3 is a sectional view which may be considered as having been taken through the right side of Figure 1 and shows the details in the construction of the motor and its associated parts which control the movement of the film advancing means, and the shutter as shown in Figure 2;

Figure 4 is a sectional view taken substantially in a plane represented by line 4—4 of Figure 3;

Figure 5 is a detail sectional view taken along the plane represented by line 5—5 of Figure 2;

Figure 6 is a detail sectional view taken along the plane represented by line 6—6 of Figure 5;

Figure 7 is a detail plane view on an enlarged scale showing the construction of the intermittent film feeding mechanism;

Figure 8 is a sectional view of the lens holder and barrel taken along the plane indicated by line 8—8 of Figure 4;

Figure 9 is a plane view showing a modified form of lens barrel;

Figure 10 is a sectional view taken substantially through the center of the barrel shown in Figure 9;

Figure 11 is a sectional view showing a modified form of signal means for timing the travel of the film through the camera; and Figure 12 is a detail sectional view taken along the plane indicated by line 12—12 of Figure 11.

More particularly describing the invention as herein illustrated reference numeral 11 indicates a motion picture camera housing or case which consists of side members 12 and 14 connected by a rim 13. A bearing plate 15 is mounted in the case against the side member 12 and spaced therefrom a suitable distance is a partition 16 which divides the case into a motor compartment and a film compartment respectively. The mid-portion of the front of the rim 13 is embossed as indicated at 17 to form what will be referred to as a shutter housing and the side of this embossed portion, which lies over the film compartment, is provided with an aperture 18 equipped with a lens holder 20 having a suitable lens 21 mounted therein.

A view-finder tube 22 is mounted between the two opposite sides of the rim and is preferably positioned immediately below the embossed shutter housing 17. As shown in Figure 6 there is secured to the partition 16 in the vicinity of the embossed portion 17 a plate 23 having a supporting face 24 bent therefrom. The face 24 is provided with an aperture 25 and has adjustably secured thereto by means of screws 26 an aperture plate 27, the same being provided with an aperture 28, the center of which lies on the optical axis of the lens 21 in the manner common to motion picture camera construction. A presser plate 29 is positioned immediately beyond the aperture plate 27 and is held in yieldable engagement therewith by means of compression springs 30 mounted on supports 31 secured to the presser plate, the supports being slidably mounted in a bracket 32. By means of a finger piece 33 the presser plate can be withdrawn from engagement against the aperture plate 27 to allow insertion between the members of the film 34.

The film to be photographed is carried from a feed reel 35 to a take-up reel 36. The feed reel 35 is of usual construction and is rotatably mounted upon a shaft 37, while the take-up reel 36 is provided with square openings 38 so as to be positively driven by the shaft 39, the operation of which will be hereinafter more fully described.

The film 34 coming from the feed reel 35 passes under a guide roll 40 and a tension roll 41, the latter being adapted to hold the film in yieldable engagement with a positively driven feed sprocket 42. The film passing over the feed sprocket 42 forms a loop around the protecting finger 43 and then passes between the presser plate 29 and the aperture plate 27, after which it is again looped adjacent the guide plate 44 below the tension roller 41' which holds it in yieldable engagement at the bottom side of the sprocket 42, the sprocket being rotated in the direction of the arrow to feed the film over a second guide roller 40', from which it is drawn onto the take-up reel 36. The guide rollers 40 and 40' and the tension rollers 41 and 41' cooperate to prevent the film from jamming, and it will be noted that the tension rollers are mounted on the outer ends of pivotally mounted arms 45 and 45'. These arms preferably have their pivot pulleys situated so that the pins supporting the guide rollers 40 and 40' form the above supports for these arms with the ends of the same opposite the tension roller being provided with upturned portions 46, between which a compression spring 47 is situated. The compression spring holds the tension rollers in yieldable engagement with the film passing over the feed sprocket 42. It will be seen that the construction of the arms 45 and 45' facilitates the feeding or locating of the film in the camera in that the tension rollers may be swung away from the feed sprocket by simply pressing the outer ends 46 of the arms towards each other. A stripping finger 49 is secured to the bracket 32, the finger terminating adjacent the sprocket 42 so as to strip the film from the upper side of the sprocket.

The film which is located between the presser plate 29 and the aperture plate 27 is intermittently advanced behind the aperture 28 by means of an intermittent mechanical movement, generally indicated by reference numeral 48, the details of which will be hereinafter more fully described.

The shutter which rotates in front of the aperture 28 is indicated by numeral 50, Figure 4, and is mounted upon shaft 51 journaled in supports 52 secured to the motor compartment side of the partition 16.

The motor used in operating the present camera comprises a spring type motor shown as being mounted in the top of its motor compartment, Figure 3, and includes a drum 53 suitably secured to one side of the partition member 16, the drum containing a coil spring 54, one end of which is secured to the drum while the other end is suitably attached to a winding shaft 55 integral with and forming an extension of shaft 37. The shaft 55 is associated with the face gear 56 through means of a ratchet wheel 57, pivoted pawls 58 and retaining spring 59. In winding the motor a key 60 adapted to cooperate with recess 61 formed in the end of shaft 55 is employed in rotating the shaft 58 in the direction of the arrow C, the pawls 58 preventing reverse rotation of the ratchet wheel 57. Upon completion of the winding operation the key can be removed and through the pawls 58 and spring 59 rotation will be imparted to the face gear 56 in the direction of arrow D. The face gear has meshing therewith a pinion 65 secured to shaft 66 rotatably mounted within the partition 16 and bearing plate 15. Also secured to shaft 66 is a gear 67, the gear engaging a feed sprocket and shutter operating pinion 68, which is mounted upon a shaft 69 having its supporting bearings in the bearing plate 15 and the partition 16, extending through the latter partition, and having the feed sprocket 42 keyed to the extending end thereof. The shaft 69 carries the pulley 70 over which a belt 71 runs to a pulley 72, the latter being keyed to shaft 39 which carries a take-up reel 36.

As more clearly shown in Figure 4, shaft 69 has also secured thereto a shutter control gear 73 which will hereinafter be referred to as a crown gear, preferably constructed by bending over the periphery of a spur gear so that the teeth thereof will engage pinion 74, keyed to the shutter shaft 51. The intermittent mechanical movement is controlled through the medium of a gear 75 also secured upon shaft 69 adjacent the crown gear 73. Gear 75 engages a pinion 76 mounted upon shaft 77, which carries another large gear 78 engaging a pinion 80 meshing with gear 81 to operate the intermittent mechanical movement. Mounted upon shaft 82 is a pinion 83 adapted to have meshing engagement with gear 78, the shaft in turn cooperating with a governor 84 for controlling the speed of the camera operating mechanism.

The intermittent film feeding mechanism shown in Figures 5 and 7 is located within the spaced supporting plates 16 and 85, the latter plate being suitably secured to partition 16 by means of studs 86. To the extending end of shaft 88, to which is keyed the operating gear 81, is suitably secured a disc or pitman wheel 90, the wheel being located within the plates 16 and 85 as described. The pitman wheel 90 carries what will hereinafter be referred to as a pitman arm or claw arm 91, having at its upper end a film engaging claw 92. The arm 91 is provided at an intermediate portion with a cam slot 93 within which is positioned the fulcrum pin 94. Pivoted to plate 85 as at 95 is a lever 96 to which is rigidly secured at its upper end the fulcrum pin 94. The lever 96 is resiliently urged in a direction towards the right against stop 97 by means of a spring 98 secured at one end to the lever and at the other end to plate 99 suitably secured to plate 85 and having struck therefrom the stop 97. The construction resiliently maintains lever 96 against the stop 97 and under normal operating conditions the fulcrum pin 94 can be considered as substantially rigid with plate 85. The pivotal mounting of plate 96, however, allows a throw-out movement to be imparted to the claws 92 in the event that the claws are not aligned with the perforations in the film. The tension of spring 98 is sufficient to maintain the parts in correct operating position, but to allow the arm 91 to yield when the claws 92 engage the sides of the film rather than the perforations therein. In the latter event the claws move down into a position where they engage the perforations and thus the construction provides simple intermittent mechanical movement which will operate automatically to align itself with the perforations in the film. The parts can be readily stamped from metal and it has been found that the cam slot causes the claw to move in two substantially straight and parallel planes advancing the films intermittently and downwardly past the aperture.

The starting and stopping operation of the camera is controlled by means of a lever member 100 pivoted to the bearing plate 15 at 101 and provided at its outer end with a pawl or shoulder 102 adapted to engage the pin 103 mounted upon the gear 81. The lever 100 is raised out of engagement with the pin by means of a sliding shaft 104 which extends through an aperture in the rim of the casing 11. The inner end of the shaft 104 engages a tapered end of lever 100 and is adapted to lift the same against the tension of spring 105. By the above construction it will be seen that the parts are at rest when pin 103 is engaged within the shoulder 102 and thus the parts assume the same relation upon the stopping of the camera mechanism. This is important since with the parts at rest the pitman arm 91 is always spaced outwardly from the aperture plate 27, thus allowing threading of the film or removal of the film, as the case may be.

Reference numeral 106, Figure 4, indicates a counter and brake mechanism consisting of an arm 107 mounted upon a shaft 108 journaled within the spaced bearing members and which in turn has mounted thereon gear 109. Also mounted in the spaced bearing members is shaft 110 which extends through plate 15 and has secured thereto the indicating disc 106. Pinion 111 on shaft 110 is adapted to mesh with gear 109 and through actuation of arm 107 the gear is rotated to rotate the indicating disc 106. By means of spring 112 secured at one end to the gear 109 and anchored to the plate members at its other end, the arm 107 is resiliently urged into engagement with the film coil upon the reel 35 to insure accurate indication of the amount of film remaining upon the reel. In order to maintain the film leading to the feed sprocket 42 taut, the spindle 37 comprising part of the motor shaft is rotated by the motor in a reverse direction from that imparted to reel 35 by the film unwinding therefrom. This rotation of spindle 37 in the reverse direction thus provides the necessary friction to retard the rotation of the reel.

Mounted upon shaft 66, as shown in Figures 3 and 4, is a projecting pin or stud 115 adapted to engage during its rotation the projecting end of shaft 116. The shaft terminates adjacent the lever 100 and is adapted to yieldingly engage the lever since the spring 117 is secured to one end of the shaft and at the other end to a stationary pin. Shaft 116 is held in position upon the bearing plate 15 through brackets 118 and it is thus seen that during each rotation of shaft 66 the stud 115 will engage the projecting end of the same to lift upwardly the shaft releasing the pressure of the same upon the lever 100. The shaft is disengaged by stud 115 and by reason of spring 117 the same is caused to snap against the lever 100 imparting thereby a signal to the finger of the operator in contact with the shaft 104. The mechanism has been designed so that the signal occurs once during the travel through the camera of a definite length of film, which, for practical purposes, is generally one foot of film. The correct number of exposures for any object can therefore be easily determined by the operator and the construction has the advantage of simplicity and the fact that it can be easily applied to cameras of standard construction.

A modified form of indicating means as disclosed in Figure 11, wherein the stud 115 secured to shaft 66 in the usual manner is adapted to engage during its rotation the vertically disposed pin 216 slidably mounted in brackets 218. To the lower end of pin 216 is secured the indicator 219 which passes through an aperture provided in the view-finder 22, Figure 12. The pin is maintained in position by means of spring 220 and as the pin is struck by the stud 115 the same will be depressed causing a movement of the indicator 219, which by reason of its location within the view-finder, will be visible to the operator. Thus the operator by counting the movements of the indicator can ascertain the number of feet of film or more correctly the number of exposures being photographed.

The present invention contemplates a novel type of lens barrel and lens holder which comprises, as shown in Figure 4, the holder 20 having screw threaded means provided for accommodating the lens 21 and a wall 120 formed to provide a centrally located supporting pin 121. Rotatably mounted upon the portion 20 is a lens barrel or cover member 122 provided with an integral wall 123 at one end thereof, the wall having an aperture 124 situated therein. Secured to the holder by means of screw 126 which also functions to rotatably mount the cover member upon the holder, is a disc 127 having the aperture 128 provided therein, the same being located on the optical axis of the lens 21 and thus coinciding with aperture 124. As shown in Figure 1, notches 130 are provided in the barrel at the base thereof, adapted to engage any suitable upstanding lug provided on the lens holder 20 and thus through means of the spring washer 131 the cover member is retained in adjusted position. A number of openings 124 of varying size are provided in wall 123 of the cover member and suitably spaced as disclosed. By rotation of the cover member any opening desired can be brought into alignment with the lens 21 and opening 128, it being understood that the size of opening 124 to be selected depends upon the light available for photographing purposes. In the modification disclosed in Figure 9, disc 227 is substituted for disc 127, the same being provided with a plurality of apertures 228. In other regards the construction of the lens mount is the same and it will be seen that aperture 228 is similar to 128 but that there is located in the remaining apertures a portrait lens 230 and light filters 231 and 232. By loosening screw 126 the plate 227 can be rotated so as to correctly position the various filters or the portrait lens and thus by the present construction the utility of the camera is materially increased by making the same capable of photographing a variety of objects and scenes.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. A motion picture camera embodying the combination of spaced frame members, a motor located between said members and having a shaft extending through one of said members, a second shaft spaced from said motor shaft and journalled in the said members, said motor shaft mounting a film reel to rotate independently of the shaft, said second mentioned shaft having a takeup reel fixed to rotate therewith, and a feed sprocket for unwinding film from said film reel, said unwinding of the film from the film reel rotating the reel in a direction reverse to the direction of rotation of the motor shaft.

2. A motion picture camera embodying the combination of spaced frame members, a motor located between said members and having a shaft extending through one of said members, a second shaft spaced from said motor shaft and journalled in said members, said shafts being driven by said motor to rotate in opposite directions, said motor shaft mounting a film carrying reel to rotate independently of the shaft, said second mentioned shaft having a takeup reel fixed to rotate therewith, and a feed sprocket for unwinding film from said film carrying reel, said unwinding of the film from the film carrying reel rotating the reel in a direction reverse to the rotation of the motor shaft whereby sufficient tension is maintained on the film between the reel and feed sprocket to keep the same taut.

3. In a motion picture camera, the combination of means for feeding film past an exposure aperture, a view finder tube, means movably mounted in the tube and having movement at intervals to interrupt the view of one sighting through the tube to thereby direct attention to the movement of said means, and connections for imparting movement to the means upon equal increments of feed of the film.

4. A motion picture camera, in combination, spaced frame members, an operating motor located between the members, shafts operated by said motor extending through one of said members, film reels mounted on said shafts, an aperture plate associated with the frame members, means for feeding the film past the aperture in said plate, a view finder tube, means slidably mounted in the tube and adapted to be visible to one sighting through the tube, and connections between the film operating mechanism and the visible means to impart movement thereto in a direction paralleling its length upon equal increments of feed of the film.

5. A motion picture camera embodying the combination of a housing provided with an aperture, spaced frame members located in said housing, a motor located between said members, shafts journalled by said members and extending outwardly from one of said members, said shafts being operated by said motor, reels supported on the extending ends of said shafts, a feed sprocket, an aperture plate secured to one of said members and having its aperture in alignment with that in the housing, a bracket fixedly secured to the same member and disposed adjacent the feed sprocket, a pressure plate supported by said bracket for maintaining the film in engagement with the aperture plate, and a protecting finger and a stripping finger provided on said bracket, said stripping finger extending within the periphery of the feed sprocket for stripping the film therefrom.

6. A motion picture camera embodying the combination of a housing provided with an aperture, spaced frame members located in said housing, a motor located between said members, shafts journalled by said members and extending outwardly from one of the members, said shafts being operated by said motor, reels supported on the extending ends of said shafts, a feed sprocket, an aperture plate secured to one of said members and having its aperture in alignment with that in the housing, a bracket secured to the same member and disposed between the feed sprocket and the aperture plate, a stripping finger projecting from said bracket and extending within the periphery of the feed sprocket for stripping film therefrom, a pressure plate supported by said bracket, and means confined between the bracket and pressure plate for yieldingly forcing the same into engagement with the aperture plate to maintain the film in engagement therewith.

7. In a motion picture camera, the combination of a housing receiving spaced partition members, an aperture plate associated with a film gate on one of said members, a feed sprocket positioned to one side of one of the members for delivering film to said film gate, arms pivotally secured to said last mentioned member and located on the respective sides of the feed sprocket, each arm to the side of their pivot adjacent the feed sprocket carrying spaced tension rollers, said arms on the other side of their pivot being extended to provide finger grasping means, and resilient means therebetween to force the tension rollers into contact with the feed sprocket.

8. A motion picture camera including in combination, spaced frame members, a plate located between said members and secured in spaced relation to one of said members, said frame members providing an aperture and mounting film supporting reels, and means for intermittently advancing said film relative to said aperture comprising a driven shaft journalled by said plate and one of said spaced frame members, a slotted pitman arm actuated by the driven shaft, a claw on said pitman arm adapted to engage the perforations in the film, a fulcrum pin located in the slot in the pitman arm, a lever having said pin fixedly secured thereto, means pivotally securing said lever to the plate, and resilient means positioned by said plate and adapted to engage said lever to urge the same in a definite direction.

LEWIS H. MOOMAW.